United States Patent Office 3,505,171
Patented Apr. 7, 1970

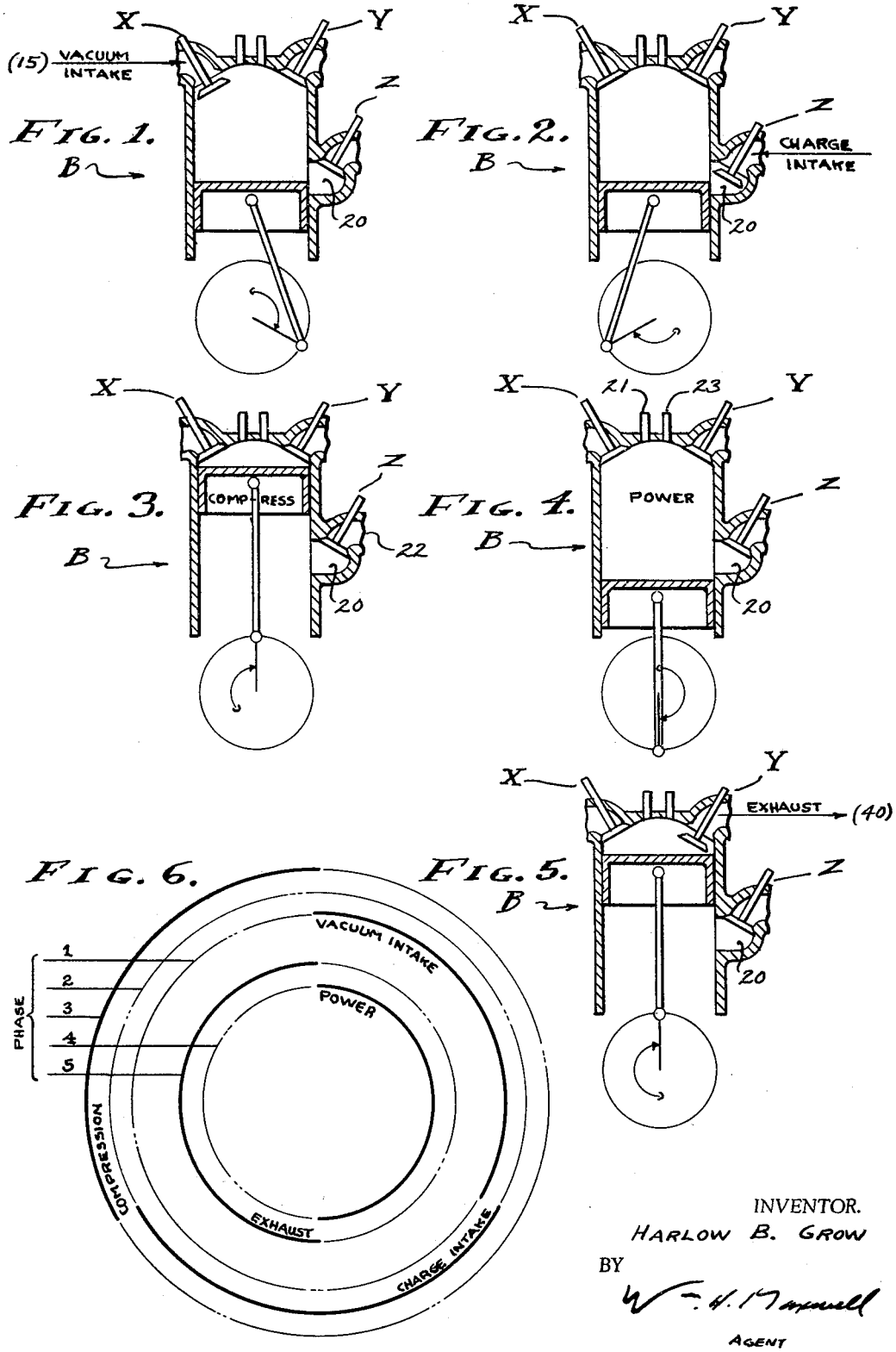

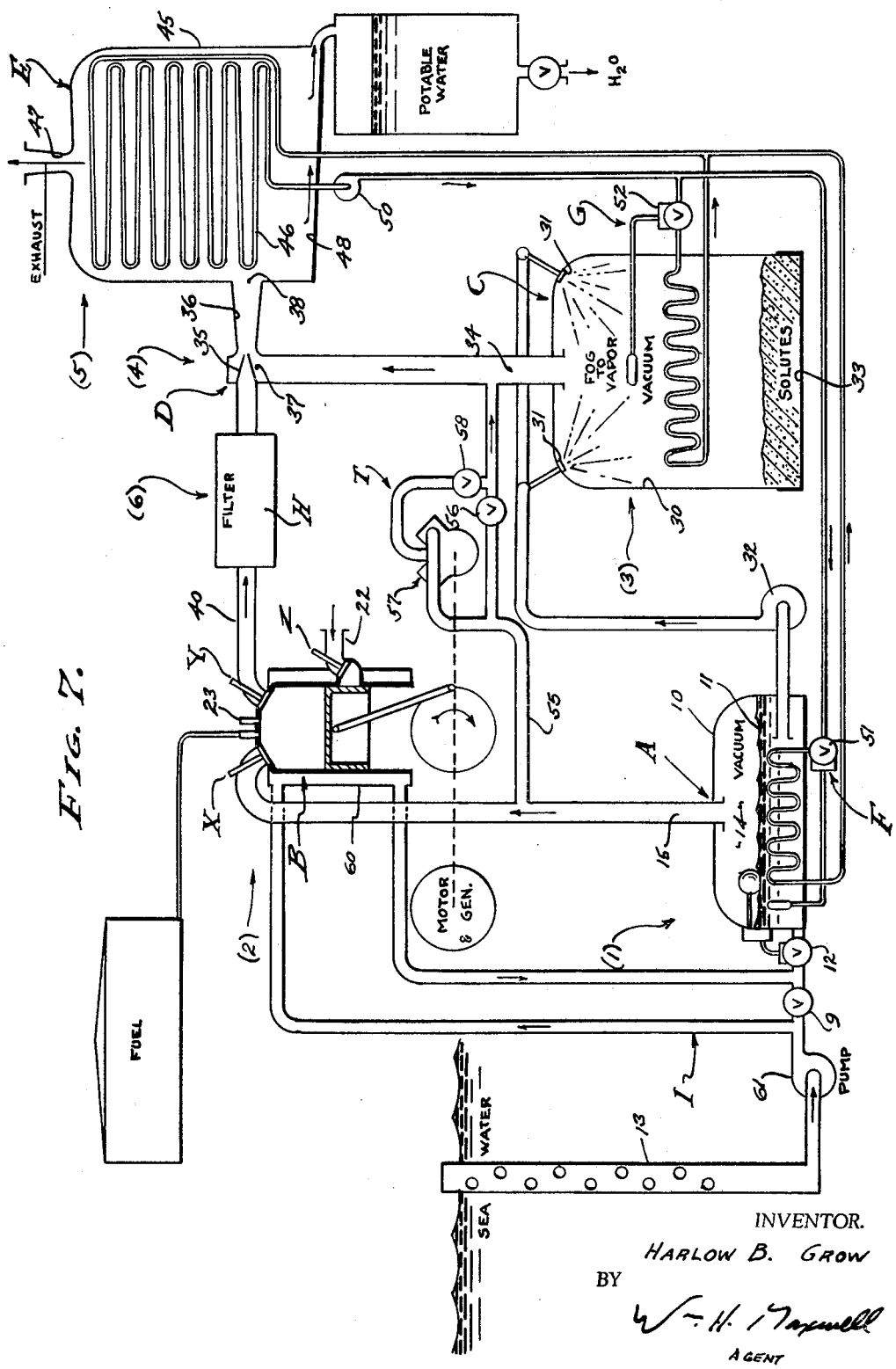

3,505,171
SEA WATER DISTILLATION-CONDENSATION UTILIZING PRIMARY AND SECONDARY EVAPORATORS AND JET EJECTOR
Harlow B. Grow, 16530 Chattanooga Place, Pacific Palisades, Calif. 90272
Filed Nov. 2, 1967, Ser. No. 680,115
Int. Cl. B01d 3/42, 3/10; C02b 1/06
U.S. Cl. 202—160         17 Claims

ABSTRACT OF THE DISCLOSURE

This invention has to do with the purification of sea water and involves a primary evaporation of impure water in a closed vessel exposing a water surface to a subatmospheric pressure and enriching said water, and a secondary evaporation of the said enriched water, and the delivery of said primary evaporation under pressure is utilized to expose the said secondary evaporation to a subatmospheric pressure, characterized by use of a jet ejector, and to effect vapor compression condensation for the production of potable water.

---

A most serious and ever-present problem is the lack of potable water, and yet the land areas of the world are bounded by substantial bodies of sea water which, due to its salinity, is neither potable nor usable for irrigation and the like. The conversion of sea water to potable water has long been known and there have been numerous methods proposed and operated that will produce potable water from sea water, however the various systems in operation today have enjoyed only limited success because they cannot produce potable water in sufficient volume with efficiency. The prior art processes have varied widely in the form of stills and evaporators, chemical processes, membrane processes and particularly the reverse-osmosis process, and most frequently in the form of cryogenic processes that involve freezing.

For example, in recent years attention has been given to vacuum-freezing systems for producing "sweet" water. However, such systems have fallen short of success because the method and apparatus used fail to efficiently desalt large volumes of sea water. It has been concluded that cryogenic freezing cycles for the conversion of saline water are economically unsound, because of the inescapable fact that with a conventional refrigeration cycle all of the product water must first be frozen, and this factor determines the size of the refrigeration equipment; accompanied by the additional factors that nothing can reduce the size required, and inefficiency can only increase it. It has been suggested that a most feasible refrigeration cycle would appear to be one with two condensing temperatures so that the heat pump principle can be applied by using the melting ice to do as much condensing as possible at low temperature. It has also shown that any process involving stage freezing that involves more than one freezing of the same product water requires an excessive amount of refrigeration capacity, with the cost of freezing equipment being rather high. Then, as a result of the formation of ice there is always the problem of separation from and/or contamination by the brackish waters and to the end that a compromise is usually resorted to; for example a most dominant prior art system forms ice from which the brine must be separated and this is accomplished in a continuous cycle wherein a large portion of sea water is returned to the sea after expending substantial energy thereon.

The method and apparatus as it is hereinafter described is principally for the desalination of sea water, however it is to be understood that this method and apparatus is equally useful for other and various applications wherein a solute is to be separated from a solution.

It is a primary object of this invention to provide an efficient method and an apparatus for carrying out the method, for the purification of liquids such as water and for the extraction of solutes therefrom, and for the separate collection of both the purification solution and extracted solutes.

It is also an object of this invention to provide a liquid purification system of the type referred to above and which continuously processes all of the intake liquid and recovers all of the solutes therefrom. That is, a characteristic feature of the present invention is that the method and also the apparatus are "functionally complete," there being no required return or discard of liquid, as to the source thereof.

It is also an object of this invention to provide a liquid purification system of the type referred to above and which advantageously utilizes atmospheric phenomenon at reduced and elevated pressures to cause vaporization and condensation of the liquid being purified. That is, it is also a characteristic feature of the present invention that pressure changes and cooling functions are brought into play in what I will term as fundamentally an "atmospheric system" wherein energy is expended to effect the said pressure changes and the said vaporizing and condensing functions.

It is still another object of this invention to provide a liquid purification system of the type referred to above and in which there is substantially no formation of ice, and a system which is to be distinguished from the prior art cryogenic systems wherein ice crystals are formed and which must then be separated from the brine that is left remaining for discard. That is, it is still another characteristic feature of the present invention that purified liquid and solutes are produced from a "conditionally temperate system."

More specifically it is an object of this invention to provide a method and apparatus that is functionally complete and particularly operative for the desalination of sea water and/or the general purification of substandard waters.

It is still another object of this invention to provide a self-sufficient method and apparatus for the purposes hereinabove refered to, that can be carried out on any desired size scale and without necessarily resorting to or relying upon the aid of other systems. That is, productive efficiency of the method or apparatus hereinafter disclosed is not dependent upon the product of, for example, electrical power as a parallel or by-product, such as in presently proposed atomic energy plants. Consequently, it is not necessary to subsidize this system with other costly and unnecessary power producing systems or the like, and with a system that I provide energy therefor can be derived from any suitable source which would include fossil fuels, hydroelectric and atomic energy power.

The various objects and features of this invention will be fully understood from the following detailed description of the typical preferred form and application thereof, throughout which description reference is made to the accompanying drawings, in which:

FIGS. 1 through 5 are cross-sectional views of the engine showing in sequence the respective five phases of operation. FIG. 6 is a schematic diagram illustrating the five phases appearing individually in each of the preceding five respective figures thereof. The accompanying drawing contains FIG. 7 which is a diagrammatic illustration of a preferred form of apparatus embodying the means comprising the present invention, and from which the method steps can be observed.

The purification method and apparatus now to be described relates to a system for purifying solutions and for removing solutes therefrom. The present need for an efficient and functionally complete system of this description is in the desalination of sea water and other substandard and/or brackish waters. To this end, therefore, I have provided a functionally complete system (method and/or apparatus) which operates at subatmospheric and superatmospheric pressures and (for the most part) at temperate conditions throughout. That is, all sea water fluid intake is processed, atmospheric climatic conditions are artificially created therein, and said conditions are maintained temperately at but not below temperatures that would cause the formation of ice therein. To these ends the method involves, generally, (1) the primary step of vaporizing the intake sea water and enriching the same, (2) the work application step of energy coupling, (3) the secondary step of vaporizing the enriched water from step one, (4) the step of producing optimum working pressures as a product of the cooperative function of the work application step, and (5) the final step of product clear water condensation. When I refer to product clear water condensation, or to the condensor thereinafter described, I am referring to distilling which includes cooling and condensing vapor so as to produce a more refined substance, in this instance water. The cooperative relationships of these steps are as follows:

The primary step of vaporizing the intake sea water and enriching the same is shown at (1) and is effected by continuously feeding intake sea water into a closed vessel wherein the enclosed sea water level is exposed to a subatmospheric pressure. The subjection to this vacuumization causes evaporation of the water ($H_2O$) solution and as a consequence the temperature of the sea water is reduced. As a result, water ($H_2O$) vapor rises from the sea water level, the temperature of the water is reduced and the remaining solution becomes enriched. In practice, this primary step includes the practice of temperature control for optimum evaporation without icing in the intake sea water, and it is preferred that heat for this purpose be discriminately applied from heat absorbed from other steps, as clearly indicated from steps (2) and (5).

The work application step of energy coupling is shown at (2) and is effected by continuously vacuumizing the rising water vapor atmosphere overlying the said sea water level of preceding step one and simultaneously pressurizing the same for cooperative utilization in the succeeding step of producing working pressures, later to be described. In accordance with the preferred form of the invention, the energy coupling involves a heat engine which produces work in the form of vacuumizing followed by pressurizing, while burning fuel to accomplish this work. An engine suitable for this purpose is a reciprocating cylinder and piston engine having vacuum and exhaust valves similar to the common four cycle internal combustion engine, but characterized by an additional charge valve. In carrying out this method the engine which comprises the energy coupling can be both driven and torque producing, and consequently power can be applied to or taken therefrom. To this end, therefore, the rotating shaft of the energy coupling engine is connected to a dynamo electric machine, for example a combined electric motor and electric generator for driving and being driven. Therefore, energy can be both supplied to and/or taken from the means which vacuumizes and pressurizes the vapor taken from the primary step of the process. And, with respect to this second step of the process it is to be understood that independent and sequential means other than the four stroke five phase cycle engine can be employed to draw a vacuum and then compress the vapor which rises out of the isolated sea water level above referred to. For the purpose of this method, it is sufficient that energy be expended to vacuumize and pressurize as hereinabove indicated, causing the vapor to rise and to transport it to subsequent steps for further processing.

The secondary step of vaporizing the enriched water from step one is shown at (3) and is effected by continuously injecting a fog or mist of the enriched water into a closed chamber wherein the enclosed fog is exposed to a subatmospheric pressure. The subjection to this vacuumization of substantial degree causes evaporation of the water ($H_2O$) solution out of the multitude of enriched water droplets and as a consequence the temperature of the atmosphere in the said chamber is reduced. As a result, the temperature of the rising water vapor or mist is lowered to near freezing (preferably above), and the remaining solutes are left to precipitate and collect at the bottom of said chamber, as is indicated. In practice, this secondary step inclueds the practice of temperature control for optimum evaporization without icing in the fog and mist atmosphere within the said chamber, and it is preferred that heat for this purpose be discriminately applied from heat absorbed at the final condensation step, as clearly indicated.

The step of producing working pressures is a product of the cooperative function of the work application step as shown at (4) and is effected by continuously ejecting the rising water vapor of the secondary step with energy available in the combined pressurized water vapor and combustion gases delivered from the intermediate work application step. In accordance with the preferred form of the invention, two working pressures are required, a first subatmospheric pressure in order to vacuumize the chamber of the preceding secondary evaporation step and a second superatmospheric pressure in order to charge the enclosure of the succeeding and final step of the product clear water condensation. In practice, and most suitable for the purpose, a fluid jet ejector is employed for these functions, utilizing the kinetic energy in the vapor and other gases under pressure from step two and expanding the same from a jet and directed through a divergent tube having an intake communicating with the vapor of the secondary evaporation step and having an exhaust into the enclosure of the final condensing step. Such fluid jet ejectors are well known in the art and are known to be efficient in their siphoning effect to establish sub and/or vacuum pressures while discharging at any desired pressures. In carrying out this invention, the required kinetic energy is from the water vapor and combustion gases delivered under pressure from the primary evaporization by the intermediate work producing step. Functionally, the combined vacuumized and pressurized vapors comingle from the two sources indicated and discharge at a substantially low but superatmospheric pressure into the enclosure of the condensor next to be described.

With the process step as hereinabove described and particularly when employing fossil fuel as energy for the second and work producing step a filtering step is interposed as shown at (6), between the pressure producing portion of said work producing step and the fluid ejector of the working pressure producing step. This filtering step is provided so as to remove the solids of combustion from the exhaust gases produced when an internal combustion engine is employed as above described; but need not be employed when and if equivalent vacuumizing and pressurizing means are employed which do not produce exhaust solids.

The final step of product clear water condensation is shown at (5) and is effected by continuously condensing the combined pressurize and vacuumized vapors eminating from the isolated sea water level at the primary evaporization step and from the isolated secondary evaporization step, by stimulating the coalescence of clear potable water ($H_2O$) within an enclosure and collecting the same as a product for delivery. Consequently, the exhaust gases generated through operation of the system as it is described above continue to flow from the system, and accordingly through a restricted discharge opening in the said enclosure; whereby pressure within the enclosure is regulated relative to the pressure to be established therein by the fluid ejector of the next preceding step of the process. Finally, the residual heat of vaporization remaining in the system is withdrawn as by means of heat absorption coils within the condensor enclosure, and this absorbed heat is transferred to and employed in heat exchangers in order to implement the heat controls hereinabove referred to in connection with both the primary and secondary evaporation steps.

As shown, the intake sea water is pumped through the water cooling jackets of the energy coupling step and admitted by a float controlled to the primary step of vaporizing, it being an object to utilize all heat energy and to temper the intake sea water so that icing thereof is prevented. Pumps can be employed to create fluid pressures for generating fog in the secondary evaporation and to transport coolant from the condensor and through the head exchangers. And a transfer pipe with the aid of a pump can be used to adjust the process to a proper vapor balance as between steps (1) and (3). The final disposition the product clear water can be through a suitable trap, as is indicated in the drawings with a spigot for drawing water therefrom.

In accordance with the present invention the method hereinabove described can be carried out, for example, with the specific apparatus shown and which involves generally, a primary vaporizing means A, a work application and energy coupling means B, a secondary vaporizing means C, a pressure producing means D, and a product clear water condensing means E. The means A receives intake water for purification, vaporizes a portion thereof and enriches the remaining portion. The means C accepts the said enriched water, completes the vaporization thereof and precipitates the solutes for collection. The work application and energy coupling means B converts energy into work for the functions of establishing a vacuum to operate the means A and to establish a supply of fluid under pressure to operate the pressure producing means D. The last mentioned means D utilizes the supply of fluid under pressure to establish two disimilar pressure conditions, one of which establishes a vacuum to operate the secondary vaporizing means C and the other a superatmospheric pressure for movement of gases and vapors through the condensing means E. Additionally, the apparatus includes temperature controlled means F for the means A and temperature controlled means G for the means C, the two of which are supplied with a heat transfer medium from the condensing means E, and includes vapor transfer means T for balance of the system and sea water induction means I.

The primary vaporizing means A intakes all of the sea water to be processed and involves a closed vessel 10 that exposes an artificial sea water level 11 to a subatmospheric pressure. In practice, the said sea water level 11 can be maintained by means of a float controlled supply valve 12, or the like, admitting the intake of sea water through a valve 9 from a standpipe 13 and into the vessel. The area of level 11 can be expansive with an atmospheric chamber 14 defined by overlying the same, and there is a suction discharge opening and duct 15 from said chamber.

The work application and energy coupling means B is shown as the four stroke five phase cycle engine hereinabove referred to, and is essentially any means or combination of means that will establish independent sub and superatmospheric pressures in the vapor as it is drawn from the means A. That is, a subatmospheric pressure is established at opening 15 followed by the establishment of a superatmospheric pressure with sufficient kinetic energy therein to operate the means D.

The engine of means B as it is cooperatively related to the other means of the apparatus can vary widely and the use of multi-cylinder engines in the many varieties of customary arrangement are contemplated. However, the following description of the engine will be limited to a single cylinder with one piston operating a single crank, it being understood that the engine configuration can vary as circumstances require. Further, it is to be understood that the engine will include all of the usual and required accessory elements, such as cam-shaft timing and valve gear to open and close the three valves, ignition means and/or fuel injection means, lubrication and cooling, etc.

As is illustrated in FIGS. 1 through 5 the engine involves, generally, the cylinder, the piston, the crank shaft, a connecting rod; and in accordance with the invention the engine is characterized by a cylinder head with an exhaust valve Y and a vacuum inlet valve X, and by a charge port 20 at the base portion of the cylinder and controlled by a charge valve Z. The cylinder is of the usual configuration, having a closed head and open to a crank case where the crank shaft is rotatable in bearings. In the event that the diesel cycle is employed the cylinder head is provided with a fuel injector 21. As is shown diagrammatically and in its simplest form, the exhaust valve Y and vacuum intake valve X are carried in the usual manner so as to open and close corresponding exhaust and intake portion in the cylinder head. The charge port 20 is located so as to open in timed sequence laterally into the cylinder at the lower division or portion of the piston movement in the usual manner common to two stroke engines, thereby permitting an ample time period for movement of gases into the cylinder when uncovered by downward travel of the piston. In the event that the Otto cycle is employed said charge port 20 may be employed for the induction of combustible mixture. In carrying out the invention the charge valve Z controls said port 20 so that its operation is compatible with the four stroke cycle involved. As is indicated, the various valves Y, X and Z are opened in timed relation to the revolvement of the crank shaft in the order clearly illustrated sequentially in FIGS. 1 through 5, and as compositely diagrammed in FIG. 6.

The piston and crank shaft are operable through four strokes involving two revolutions of said crank shaft. The four strokes correspond to the usual intake-compression-power-exhaust of the conventional four stroke engine, with the exception that the first mentioned "intake" is divided into two phases instead of but one phase. To this end therefore, the engine is operable through five phases illustrated as follows:

FIG. 1—Vacuum intake
FIG. 2—Charge intake
FIG. 3—Compression
FIG. 4—Power
FIG. 5—Exhaust these five phases occurring sequentially as they are shown in FIGS. 1 through 5 respectively.

Phase one which is shown in FIG. 1 is the vacuum intake function which is unique with this engine. Although the vacuum intake valve X appears to be similar to the intake valves of conventional engines, this valve is associated with a subatmospheric pressure water vapor source at opening 15. The vacuum intake valve opens during phase one, which occurs when the piston and crank shaft revolve from top dead center through a substantial portion of the first stroke, clearly illustrated as approximately two thirds of the first stroke. All other valving remains closed during this time period, whereby gases are drawn into the cylinder from the water vapor source at opening 15 and thereby reducing the vapor source pressure, to vacuumize the chamber 14 in vessel 10. At the termination of phase one and preferably prior to opening of ports and valving having to do with phase two, the vacuum valve X is closed in order to preserve the reduced gas pressure that has been pumped and/or drawn from the primary evaporation means A.

Phase two which is shown in FIG. 2 is the charge intake function and which is cooperatively related to the preceding function and which is also unique with this invention. Having established a reduced gas pressure within the cylinder and having closed the vacuum intake valve X, the piston moves to expose the charge port 20. The charge port 20 is located at the base end of the cylinder and remains open into the cylinder during the latter portion of the first stroke, through the bottom dead center position, and during the intial portion of the second stroke, clearly illustrated as equivalent to two thirds of a stroke and/or approximately for the same time period as is shown alotted for phase one. Accordingly, the charge intake valve Z can be opened throughout phase two and at least during the first stroke, it being apparent that there may be circumstances when it will be advantageous to close valve Z at bottom dead center. All other valving remains closed during this time period, whereby gases are drawn into the cylinder from the atmosphere in the case of employing the diesel cycle, through a carburation means in the case of employing the Otto cycle, and in either case supercharged if circumstances require.

Phase three which is shown in FIG. 3 is the compression function and which is also unique with this engine in that its commencement is controlled by the cooperative arrangement of charge port 20 and charge valve Z. In this respect the charge port 20 can be selectively closed at any desired point by the charge valve Z, during the initial portion of the second stroke. For example, it is feasible to accelerate closing of the charge valve Z, as when supercharging is employed in the manifold 22, and thereby increase the effective compression ratio. Thus, the compression phase three can occur during all or a portion of the second stroke, during which time period all other valving remains closed, and whereby gases captured in the cylinder are compressed a maximum upon the piston an crank shaft reaching top dead center position.

Phase four which is shown in FIG. 4 is the power function and which is basically conventional and in some respects unique. In the event that the diesel cycle is employed fuel is injected at injector 21, and in the event that the Otto cycle is employed a spark is made at a plug 23. Said injection and/or spark is ignition is suitably timed according to usual practices. In accordance with this invention, however, the power functions of phase four occur during the third stroke between top dead center and bottom dead center, during which time period all valving remains closed including valve Z. Therefore, the charge port 20 is inherently opened during the latter portion of the third stroke and is rendered inoperative by the charge valve Z which remains closed.

Phase five which is shown in FIG. 5 is the exhaust function and which is basically conventional and also in some respects unique. In accordance with the invention the exhaust function of phase five occurs during the fourth stroke, between bottom dead center and top dead center, during which time period the exhaust valve Y is open and all other valves remain closed. Again, the charge port 20 is inherently opened during the initial portion of the fourth stroke and is rendered inoperative by the charge valve Z which remains closed.

For purposes of illustration, and as diagrammatically illustrated in FIG. 6, the opening and closing of the three valves Y, X and Z are related to the top dead center and bottom dead center positions of the piston and rotative positions of the crank shaft. It is to be understood, however, that the opening and closing of said valves can occur before and/or after reaching the said dead center positions, as is commonly practiced in the engine art. Consequently, it will be seen that the engine of means B herein disclosed is a dual intake engine, characterized by a vacuum intake and a charge intake. Assuming that the piston is at top dead center for the beginning of phase one, vacuum intake valve X is opened so that a vacuum is created in the cylinder and thus the desired work of vacuumizing the vessel 10 and chamber 14 is accomplished. Assuming then that phases two, three and four follow as above described, and that the piston is at the bottom dead center for the beginning of phase five, exhaust valve Y is opened so that gases and water vapors in the cylinder are compressed into exhaust manifold 23 communicating with the jet of means D later described.

The secondary vaporizing means C preferably accepts all of the enriched water from the primary vaporizing means A, for the functions of complete vaporization and complete extraction of by-products or solutes. The mean C involves a closed chamber 30 that is charged with an artificial fog or mist of said enriched water and which exposes said fog to a subatmospheric pressure. In practice, the fog is established by the use of fog nozzles 31 directed into the chamber 30, and supplied by a suitable pump 32 drawing enriched water from the sump portion of vessel 10. Substantially the entire volume of chamber 30 can expose the fog so said sub pressure, whereby the said fog vaporizes to be drawn out of the chamber through a discharge opening-duct 34, and thereby releases the solutes for the precipitation of by-products to the base or pan 33 of the chamber. In practice, the pan 33 can be made removable for the withdrawal of the by-products from the chamber, for example through a suitable pressure trap means (not shown). Accordingly, the fog is converted to vapor by the application of subatmospheric pressure accompanied by a near freezing temperature environment, and with optimum pressure and temperature the evaporation into vapor is substantially complete and without icing whereby all the solutes inherently precipitate for collection and subsequent extraction from the chamber 30.

The pressure producing means D has the dual functions of establishing a first subatmospheric pressure in the chamber 30 and a second superatmospheric pressure in order to charge the enclosure of the distilling means E. Although these two functions might be conducted separately, a most suitable means for advantageously utilizing the kinetic energy in the compressed vapor delivered by means B is a fluid ejector having a jet 35 that directs the vapor centrally through a divergent duct 36. The jet ejector intake 37 communicates with the interior of chamber 30 through the opening-duct 34, and the jet ejector discharge 38 is into the enclosure of the condensor means E. This preferred jet ejector of means D utilizes kinetic energy to establish a subatmospheric pressure at the intake 37, establishing residual superatmospheric pressure at the discharge 38, said residual pressure being retained for establishing an environment conducive to condensing and for the transport of fluids through the means E.

In carrying out this invention, and particularly when employing a work producing engine of the type above described, a filter H is provided in the compressed vapor and exhaust duct 40 extending from the exhaust valve Y to the ejector D, and it can be of any suitable construction, quite commonly referred to as a "scrubber," and to remove the solids of combustion from the vapors and exhaust gases flowing from the internal combustion engine of the means B as above described.

The product clear water condenser means E is charged by the preceding pressure producing means D which combines the vacuumized vapors eminating from both the primary and secondary evaporating means A and C, and including the added products (water vapor) of combustion from the intermediate engine above described. The means E is a condensor which involves an enclosure 45 and condensor elements 46 in the form of coolant conduction coils (46) or the like. The discharge 38 of the divergent duct 36 directs the water laden vapors of the evaporators A and C, together with the added vapor from the internal combustion process, into the enclosure 45; there being a restricted and discriminately sized vent 47 opening from the said enclosure, and to the surrounding atmosphere, for establishing and maintaining optimum operating pressure for the condensing functions. Thus, a profuse and substantially complete coalescing of all water vapors takes place in the enclosure 45, and which is stimulated by the absorption of heat while maintaining pressure within the enclosure 45. By employing an effective and efficient condensor element 46 it is possible to remove substantially all the remaining heat in the system, and by selecting a discharge vent 47 that promotes an exhaust of gases at and/or slightly above the surrounding atmospheric pressure, an effective expenditure of input energy is fully realized. In practice, a sump 48 is provided for the collection of the condensate or distilled product clear water ($H_2O$), and from which the said product is dispensed through a trap T (or suitable reservoir) with the aid of valves, etc. as circumstances require.

The additional temperature control means F and G are supplied by and advantageously employed to expend heat energy absorbed by the condensor elements 46. In practice, a pump 50 circulates a coolant through the elements 46 and through means F and G, the latter two means being independently regulated by thermostat activated valves 51 and 52 respectively, governed by probs positioned as shown. In practice, the balance of heat absorbed at means E is employed in the controlled elimination of icing in the vessel 10 and in the chamber 30, and any residual heat can be used elsewhere in the system where and as required.

The additional vapor transfer means T is employed to control and balance the operational system and involves a transfer pipe 55 for open communication between opening 15 and opening-duct 34 of the primary and secondary vaporizing means respectively. In practice, the normal operating pressure differential between the primary and secondary vaporizing means will cause a transfer of vapors toward the latter secondary opening-duct 34, and all of which is controlled by a transfer valve 56. n the event that assistance is necessary for a required transfer of vapor, a vapor pump 57 and control valve 58 is operated as by the engine means B and the valves 56 and 58 adjusted accordingly.

The additional sea water induction means I is employed to utilize resultant heat from the operation of the engine means B, a characteristic of this system being the prevention of ice formations in either vaporizing means. Consequently, it is advantageous to temper the intake of sea water and this is cooperatively accomplished through the full utilization of otherwise waste engine heat, which is absorbed at the cylinder jackets 60 and admitted into chamber 10 through the float controlled valve 12. In practice, a pump 61 establishes the required intake sea water circulation and the induction valve 9 can be adjusted so as to establish the flow balance as circumstances require.

From the foregoing it will be seen that I have provided an efficient method and/or apparatus for the purification of liquids and particularly for the desalination of sea water. A characteristic feature of the present invention is the approach to but the elimination of icing and/or freezing, all of which is conducted in a functionally complete system wherein the various operations are cooperatively interrelated and dependent upon each other, and all to the end that the entire intake of liquid solution can be processed, thereby producing potable water and by-products.

Having described only a typical preferred form and application of my invention, I do not wish to be limited or restricted to the specific details herein set forth, but wish to reserve to myself any modifications or variations that may appear to those skilled in the art.

Having described my invention, I claim:

1. Apparatus for the purification of sea water and the like and for removing the solutes therefrom, and including:

a primary vaporizing means receiving intake water, removing vapors therefrom and thereby enriching the same;

an energy coupling means comprising an engine for converting energy into work and having a suction inlet for vapor and a pressurized vapor outlet for discharging pressurized vapors, said suction inlet being connected to the primary vaporizing means to create vacuum pressure therein for removing vapors from said primary vaporizing means;

a secondary vaporizing means receiving the enriched water from the primary vaporizing means and collecting the solutes therefrom;

a pressure producing means comprising a jet ejector utilizing the said pressurized vapors discharged from said vapor outlet by said energy coupling means and effecting two working pressures, a first vacuumizing pressure applied to and effecting subatmospheric pressure operation of the secondary vaporizing means, and a second positive pressure applied to and effecting superatmospheric pressure operation of a condensing means;

and said condensing means being a vapor compression condensing means receiving the comingled vapors of both the primary and secondary vaporizing means applied by the pressure producing means at said second positive pressure for the collection of purified water therefrom.

2. The apparatus for the purification of sea water and the like and for removing the solutes therefrom as set forth in claim 1 and wherein; the vaporizing means each comprises a closed-chamber element exposing the water therein to vaporizing pressure effected by the other recited means.

3. The apparatus for the purification of sea water and the like and for removing the solutes therefrom as set forth in claim 1 and wherein; the primary vaporizing means comprises a closed vessel containing the intake water and exposing the same to vaporizing pressures effected by the other recited means.

4. The apparatus for the purification of sea water and the like and for removing the solutes therefrom as set forth in claim 1 and wherein; the secondary vaporizing means comprises a closed-chamber element and means injecting fog of said enriched water therein for exposure to vaporizing pressures effected by the other recited means.

5. The apparatus for the purification of sea water and the like and for removing the solutes therefrom as set forth in claim 1 and wherein; the energy coupling means and the pressure proudcing means each include means to effect a vacuumizing pressure on said respective vaporizing means.

6. The apparatus for the purification of sea water and the like and for removing the solutes therefrom as set forth in claim 1 and wherein; temperature control means maintains temperature within vaporizing means above that whereat the water therein freezes.

7. The apparatus for the purification of sea water and the like and for removing the solutes therefrom as set forth in claim 1 and wherein; the energy coupling means includes a vacuum pressure means drawing from the primary vaporizing means, and means subsequently increasing pressure to the vapors arising therefrom, thereby storing kinetic energy therein for use in subsequent pressure producing means.

8. The apparatus for the purification of sea water and the like and for removing the solutes therefrom as set forth in claim 1 and wherein; the pressure producing means includes means exacting kinetic energy from the pressurizing of the vapors from the energy coupling means through the expansion of the same.

9. The apparatus for the purification of sea water and the like and for removing the solutes therefrom as set forth in claim 1 and wherein; the pressure producing means includes a fluid jet ejector exacting kinetic energy from the pressurizing of the vapors from the energy coupling means through the expansion of the same, the first pressure applied being a vacuum intake pressure and the second pressure applied being a positive exhaust pressure.

10. The apparatus for the purification of sea water and the like and for removing the solutes therefrom as set forth in claim 1 and wherein; the condensing means releases heat energy, there being temperature control means employing said heat energy to maintain temperatures within the vaporizing means above that whereat the water therein freezes.

11. An apparatus for the purification of sea water and the like and for removing the solutes therefrom, and including:
   a primary vaporizing means comprising a vessel to receive intake water for exposure to a vaporizing pressure;
   an energy coupling means characterized by a four stroke five phase cycle reciprocating internal combustion engine having a cylinder and a piston reciprocably operating in the cylinder, said engine including; a vacuum intake valve with means to open the same into said vessel during the initial portion of the first stroke and effecting the first phase of vacuum intake, a charge port uncovered by movement of the piston and open during the latter portion of the first stroke and through the initial portion of the second stroke and effecting the second phase of charge intake, and a charge valve related to said charge port and with means to open the same only during said second phase, said valves remaining closed following the second phase and throughout the remaining second stroke thereby effecting the third phase of compression and remaining closed throughout the third stroke and thereby effecting the fourth phase of power, and an exhaust valve with means to open the same and effect subsequent pressurizing of the vapors arising from the water in the vessel during the fourth stroke and thereby effecting the fifth phase of exhaust;
   a secondary vaporizing means comprising a closed-chamber element to contain the enriched water from the primary vaporizing means for exposure to a vaporizing pressure;
   a pressure producing means utilizing the said pressurizing of the vapors by said energy coupling means and effecting two working pressures, a first pressure applied to and effecting subatmospheric pressure operation of the secondary vaporizing means, and a second pressure applied to and effecting superatmospheric pressure operation of a condensing means;
   and said condensing means receiving the comingled vapors of both the primary and secondary vaporizing means and applied by the pressure producing means at said second pressure for the collection of water therefrom.

12. The purification apparatus as set forth in claim 11 and wherein: fog producing means sprays the enriched liquid from the primary vaporizing means and injects the same as fog into the closed-chamber element of the secondary vaporizing means.

13. The purification apparatus as set forth in claim 11 and wherein; the said pressure producing means includes vacuum means applying said first pressure to the secondary vaporizing means.

14. The purification apparatus as set forth in claim 11 and wherein, the temperature control means includes means maintaining temperatures within the vaporizing means above that whereat the water therein freezes.

15. The purification apparatus as set forth in claim 11 and wherein; the said pressure producing means includes means exacting kinetic energy from the pressurizing of the vapors from the energy coupling means through the expansion of the same.

16. The purification apparatus as set forth in claim 11 and wherein; the said pressure producing means includes a fluid ejector exacting kinetic energy from the pressurizing of the vapors from the energy coupling means through the expansion of the same, the first pressure applied being a vacuum intake pressure and the second pressure applied being a positive exhaust pressure.

17. The purification apparatus as set forth in claim 11 and wherein; the said condensing means includes means releasing heat energy, there being temperature control means employing said heat energy to maintain temperature within vaporizing means above that whereat the water therein freezes.

References Cited

UNITED STATES PATENTS

| | | | |
|---|---|---|---|
| 2,280,093 | 4/1942 | Kleinschmidt | 203—26 |
| 2,389,064 | 11/1945 | Latham | 203—26 |
| 2,537,259 | 1/1951 | Cleaver et al. | 203—24 X |
| 2,589,406 | 3/1952 | Latham | 203—24 X |
| 2,863,501 | 12/1958 | Farnsworth | 203—11 X |
| 3,318,784 | 5/1967 | Murphy | 203—11 X |
| 3,326,778 | 6/1967 | Mock | 202—234 |
| 3,369,977 | 2/1968 | Bechard | 203—11 |
| 3,408,262 | 10/1968 | Matye | 202—177 |
| 3,364,126 | 1/1968 | Gutterman et al. | 203—11 |
| 3,290,229 | 12/1966 | Brown | 202—177 |
| 3,300,392 | 1/1967 | Ross et al. | 202—176 |
| 3,420,747 | 1/1969 | Williamson | 202—173 |

FOREIGN PATENTS 667,832  7/1963  Canada.

F. E. DRUMMOND, Assistant Examiner

U.S. Cl. X.R.

203—2, 24, 25, 11; 202—236, 200, 205